United States Patent [19]

Hung

[11] 4,357,798

[45] Nov. 9, 1982

[54] RAPID ACTUATING DEVICE OF HYDRAULIC ACTUATOR

[76] Inventor: Michael Hung, 6th Fl., No. 65, Sec. 3, Nanking E. Rd., Taipei, Taiwan

[21] Appl. No.: 129,843

[22] Filed: Mar. 13, 1980

[51] Int. Cl.³ ........................ F16D 31/02; F04B 49/08; F04B 19/02

[52] U.S. Cl. ........................................ 60/477; 92/108; 417/468; 417/302

[58] Field of Search ............... 417/469, 460, 487, 521, 417/302, 307, 284, 285, 468; 92/108; 60/477

[56] References Cited

U.S. PATENT DOCUMENTS 840,919 1/1907 Deis .................................... 417/460
867,932 10/1907 Weeks ............................ 417/468 X
3,112,705 12/1963 Chlebowski .................... 417/487 X
4,026,113 5/1977 Sherman .............................. 60/477

FOREIGN PATENT DOCUMENTS 407075 3/1934 United Kingdom ................ 417/460

*Primary Examiner*—Richard E. Gluck
*Attorney, Agent, or Firm*—Blair, Brown & Kreten

[57] ABSTRACT

Discussed herein is a rapid actuating device for a hydraulic actuator utilizing two or more relief valves to control the hydraulic flow of the actuator for various loading or no loading conditions in order to speed up the required operation time.

1 Claim, 6 Drawing Figures

RAPID ACTUATING DEVICE OF HYDRAULIC ACTUATOR

BACKGROUND OF THE INVENTION

The major function of an ordinary hydraulic actuator is to use hydraulic energy (produced by hydraulic source, i.e. pumps) to carry loading into linear, reciprocating or other types of mechanical operations. For example, hydraulic jacks are used to lift a load to a required height, however the lifting speed of actuator is constant in heavy loading, light loading or without loading conditions.

An ordinary jack wastes time and effort while the actuator is under light loading or no loading condition because the lifting speed is limited by the hydraulic pressure which is rated for heavy loading condition. The lifting speed should be faster while in no loading or light loading to minimize the time required for lifting its load. Therefore the ordinary actuator design cannot utilize to full advantage the hydraulic energy to speed up the lifting operation to save time and effort.

SUMMARY OF THE INVENTION

A hydraulic actuator is actuated by means of a load, and ram force is produced by pressure fluid from one, two or more pump pistons which pump pressure fluid through a convergent passage to an actuator.

Every pump piston has a relief valve which controls the relief passage under each rated pressure. Hydraulic pressure induced by ram force for different loading or no loading conditions will actuate one or some of the relief valves; in the mean time those actuated relief valves are opened and part of the fluids return to the reservoir so that the flow rate in a convergent passage is changed according to the loading and causes a different actuator moving speed.

The hydraulic flow rates are changed automatically by presetting the relief valve pressure in order to save time and effort for various loading conditions.

DESCRIPTION OF THE PREFERRED EMBODIMENT

Figure 1:
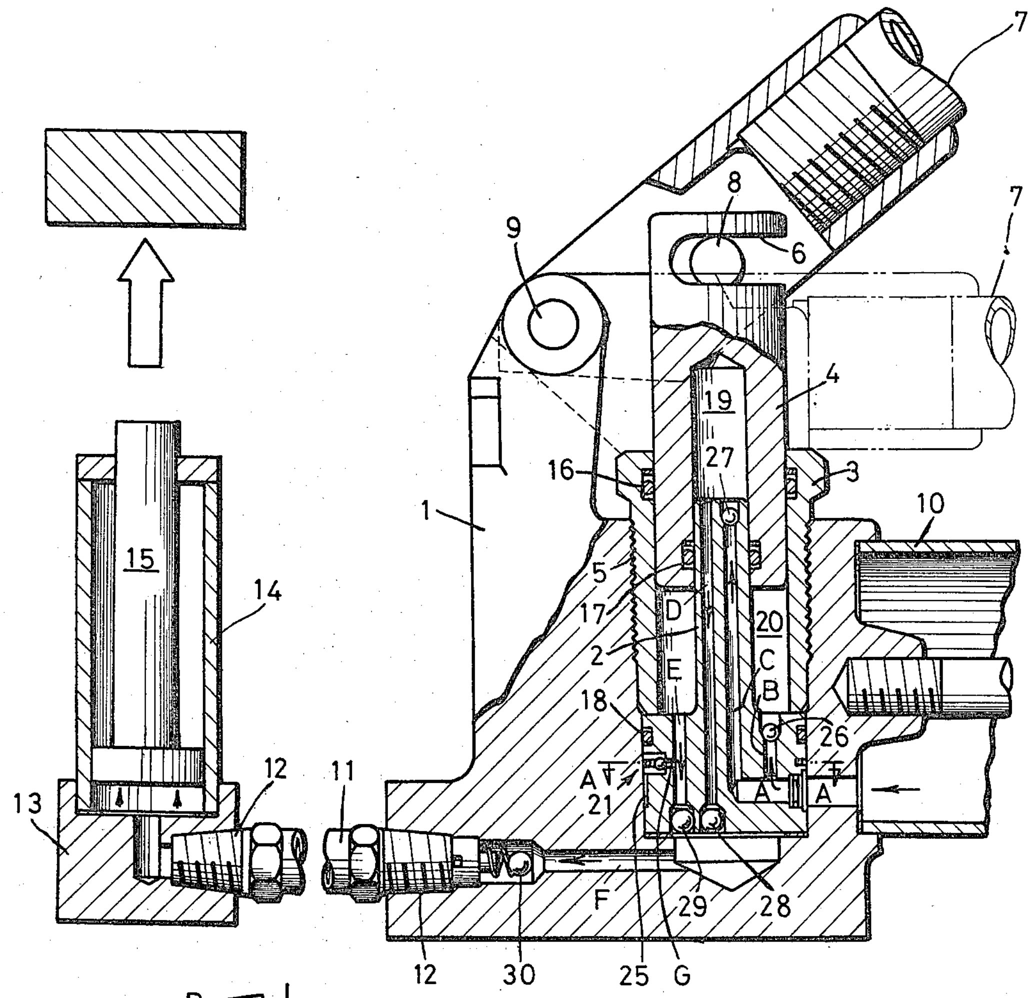
FIG. 1 is an assembly drawing of a manually operated hydraulic jack.

Referring to FIG. 1, there is shown a base 1, a small diameter piston 2 housed inside a cylinder of the base pump, the pump cylinder 3 fastened by thread 5 and pushed against the outer rim of the small diameter piston 2 thereby fixing it firmly; a larger diameter piston 4 which runs freely between pump cylinder 3 and the small diameter piston 2 but still retains hydraulic sealing at the interfaces thereof. The top side of larger diameter piston 4 has a slot 6. The operating lever 7 will drive the larger diameter piston 4 by means of block 8 and slot 6 to slide upward and downward inside the pump cylinder 3. The operating lever 7 is mounted on the pump base 1 through pivot 9 to drive the larger diameter piston 4.

On the right side of pump base 1 is a reservoir 10; the left side of pump base 1 is connected by a high pressure hose 11 and connector 12 to cylinder base 13, on the upper portion of cylinder base 13 is the cylinder 14 and ram 15, and this ram 15 is used for load lifting.

Above are the rough descriptions of construction of this embodiment (a manually operated hydraulic jack). The critical function of each passage of this hydraulic jack will be explained as follows: please refer to FIG. 1, O-rings 16, 17 and 18 are respectively mounted between; pump cylinder 3 and larger diameter piston 4, larger diameter piston 4 and small diameter piston 2, and small diameter piston 2 and pump base 1. The larger diameter piston 4 is tightly fitted between small diameter piston 2 and pump cylinder 2, thus they form a small piston chamber between the smaller diameter piston 2 and the larger diameter piston 4. Two chambers 19 and 20 are varied in their displacement while the larger diameter piston 4 is ascending or descending.

Hydraulic access main passage "A" has two jointed branch passages "B" and "C" to feed oil from reservoir 10 into the two chambers 19 and 20. The branch passages "D" and "E" are connected respectively to piston chambers 19 and 20. Those two passages ("D" and "E") all lead to the convergent passage "F" and pressurized oil will feed into the cylinder 14 through high pressure hose 11, the relief valve 21 is located between branch passage "E" and reservoir 10. These functions are shown in the section view A—A of FIG. 4, thus please refer to FIG. 1 and FIG. 4 for the relief valve function, 26, 27, 28, 29 and 30 are steel balls, respectively, for the one-way branch passage "B", "C", "D", "E" and convergent passage "F" to control oil flow in a one-way direction. The relief valve 21 comprises a steel ball 22 and an elastic piece 24 which holds the steel ball 22 in a circular slot 23 of small diameter piston 2. The elastic piece 24 is fixed by welding or riveting one end to the circular slot 23, the other end of the elastic piece 24 holds the steel ball 22 more radially within the circular slot 23 of small diameter piston 2. While operating under a no load condition, the hydraulic pressure of larger piston chamber 20 will not exceed the spring force of elastic piece 24 so that steel ball 22 is retained by the spring force of elastic piece 24. The fluid from piston chambers 19 and 20 will flow through branch passage D and E and will lead to the convergent passage "F". The hydraulic flow of convergent passage "F" will be the sum of branch passages D and E, thus the hydraulic flow rate is faster during the unloaded condition and the ram 15 will have a faster actuating speed and also lift more rapidly. In case the ram 15 lifts to a certain position and reaches a load, then the hydraulic pressure in convergent passage "F" will be increased by the relative pressure due to the loading which is applied to ram 15. Under this condition the hydraulic pressure of the larger piston chamber 20 will be less than the hydraulic pressure of convergent passage "F". In the mean time, the increased hydraulic pressure of larger piston chamber 20 will exceed the spring force of elastic piece 24 so that the fluid of larger piston chamber 20 can flow through relief passage "G" (refer to FIG. 4) and the circular slot 25 back to the main passage "A", and only the fluid of small piston chamber 19 and overcome the pressure and flow through branch passage "D" to cylinder 14, hence the hydraulic flow rate of the convergent passage "F" is reduced, and the lifting speed of ram 15 will be slowed down simultaneously. Three conditions will be encountered; (1) change the fast actuating speed from no-load to a slower actuating speed with a load; (2) after the transfer to a slower actuating speed caused by heavy loading, only the hydraulic pressure of small piston chamber 19 can overcome the resistance of ram 15 because the smaller cross section area of small diameter piston 19 is higher than that of the larger diameter piston 4; the branch passage "D", "E" and relief passage "G" have only the hydraulic resistance from the spring force of elastic piece 24; the ram can lift up a heavy load effectively as would an ordinary jack; and (3) while the loading is not heavy enough that both of two valve systems-"C" and "D", "B" and "E" are opened, the hydraulic pressure can lift up the ram 15 rapidly and effectively.

Figure 2:
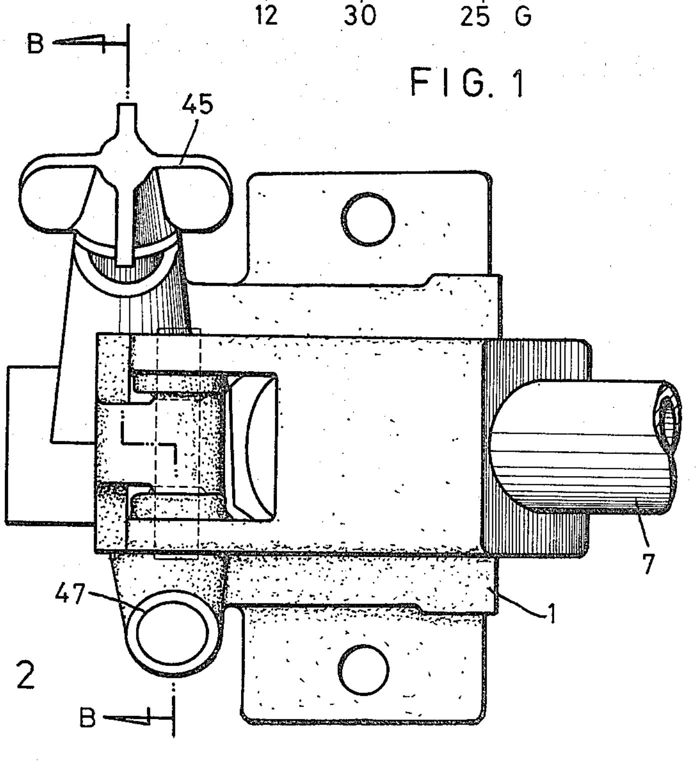
FIG. 2 is a top view of FIG. 1.

Elastic piece 24 can be replaced by other types of springs; whatever the spring type is, the relief pressure can be set by the spring force. FIG. 2, a top view, numeral 45 is a handle cap screw for releasing the pressure of cylinder 14. The relationship of handle cap screw 45 and releasing valve 46 is shown in FIG. 3.

Figure 3:
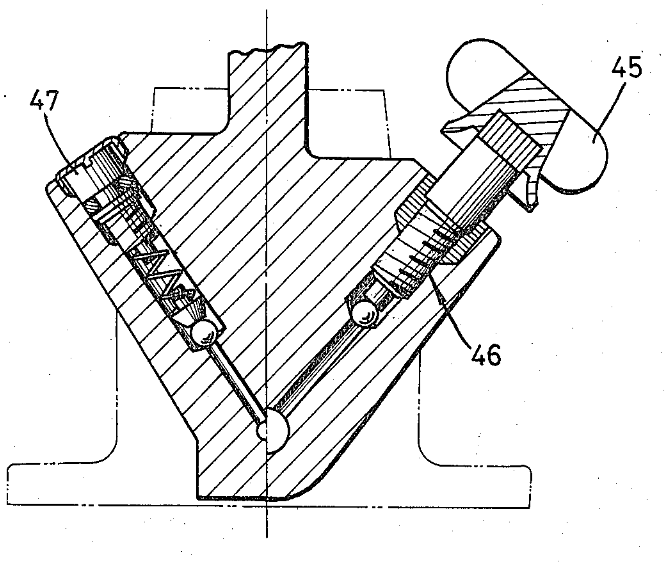
FIG. 3 is a section view B—B of FIG. 2.
Figure 4:
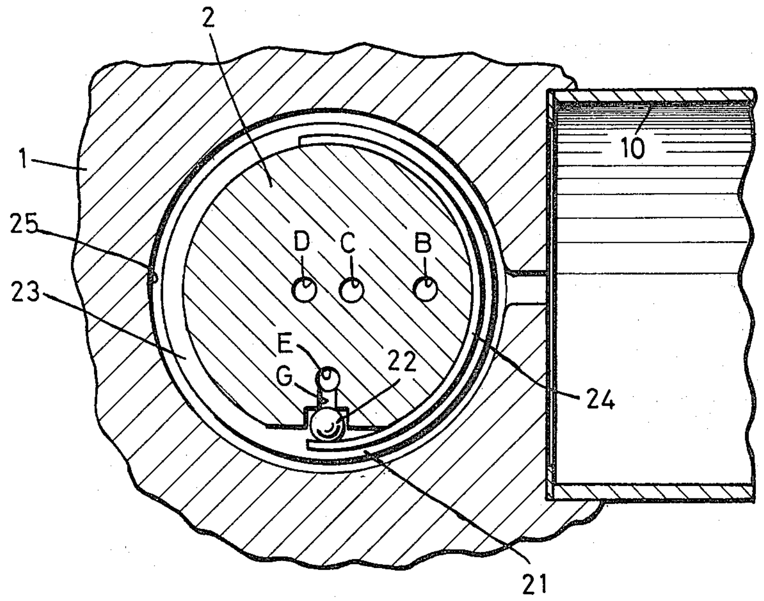
FIG. 4 is a section view A—A of FIG. 1.
Figure 5:
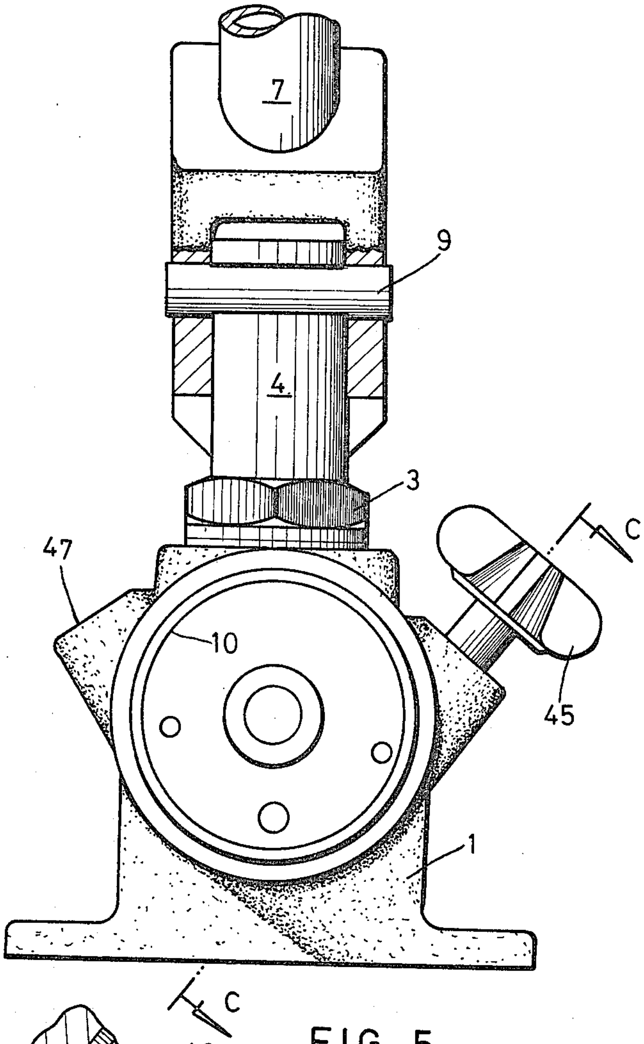
FIG. 5 is a side view from FIG. 1.

FIG. 3 is a section view of B—B from FIG. 2. The right portion of FIG. 3 is the construction of releasing valve 46 and handle cap screw 45. The left portion shown in FIG. 3 is the safety valve 47 for limiting the maximum ram pressure. FIG. 4 is a cross section view A—A from FIG. 1 which shows the elastic piece 24 in the circular slot 23 of small diameter piston 2 and how the hydraulic fluid flow from relief valve 21 extends through circular slot 25 back to reservoir 10. FIG. 5 is the right side view of FIG. 1.

Figure 6:
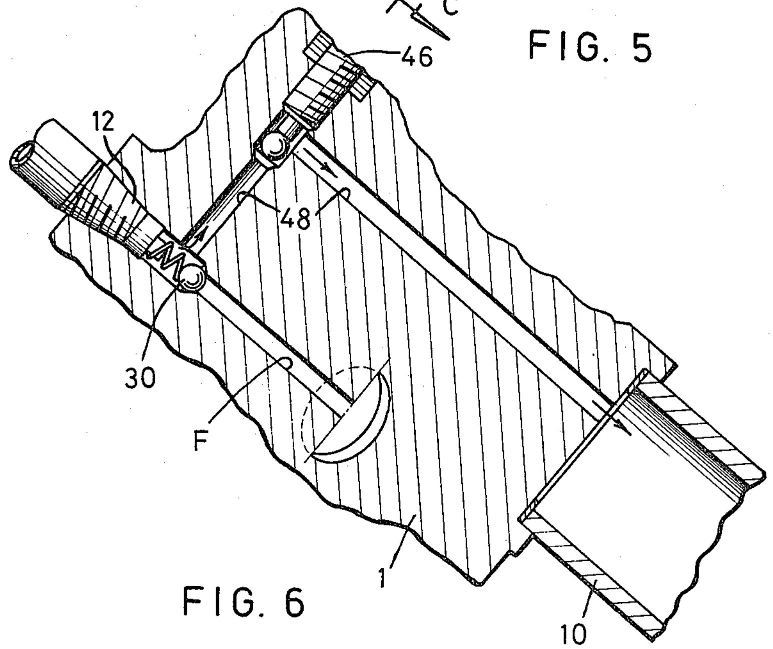
FIG. 6 is a section view C—C of FIG. 5.

FIG. 6 is the cross sectional view C—C from FIG. 5, and shows the construction of connector 12, relief valve 46 and reservoir. The number 48 indicates the relief passage.

What is claimed is:

1. A hydraulic actuator for use in extending a ram relative to its associated ram cylinder comprising in combination:

a first cylinder supported in a base, a first piston operatively disposed therein connected to means for translating said first piston within said first cylinder, a bore within said first piston defining a second cylinder, a second piston operatively disposed within said second cylinder whereby translation of said first piston causes volumetric change in said second cylinder, and valved hydraulic fluid conduit means extending between said pistons and said ram whereby translation of said first piston moves said ram, wherein said conduit means includes an hydraulic pressure sensitive bypass means whereby a portion of hydraulic fluid pumped by said pistons can be diverted back to a reservoir and said ram will move more slowly, wherein said bypass means comprises a relief valve disposed on a passageway which forms a portion of said conduit means, said passageway extends from said first cylinder to said ram, wherein said relief valve comprises an elastic piece disposed in a groove on a lower portion of said second piston, said passageway extending through said second piston and communicating with said groove through a hole in said second piston, a ball covering said hole and biased thereagainst by a free end of said elastic piece, a fixed end of which is constrained in said groove on said second piston whereby hydraulic pressure in excess of the elastic piece's resiliencey displaces said ball and causes the hydraulic fluid to bleed therethrough to said reservoir.

* * * * *